(12) United States Patent
Codling

(10) Patent No.: US 6,382,259 B1
(45) Date of Patent: May 7, 2002

(54) INSULATED PIPEWORK SYSTEMS

(75) Inventor: Russell Codling, Northampton (GB)

(73) Assignee: Corus UK Limited

( * ) Notice: Subject to any disclaimer, the term of this patent is extended or adjusted under 35 U.S.C. 154(b) by 0 days.

(21) Appl. No.: 09/446,105

(22) PCT Filed: Jun. 22, 1998

(86) PCT No.: PCT/GB98/01822

§ 371 Date: Dec. 23, 1999

§ 102(e) Date: Dec. 23, 1999

(87) PCT Pub. No.: WO98/59193

PCT Pub. Date: Dec. 30, 1998

(51) Int. Cl.$^7$ ................................................. F16L 9/14
(52) U.S. Cl. ................ 138/149; 138/137; 138/DIG. 9; 138/140
(58) Field of Search ........................ 138/149, DIG. 9, 138/137, 141, 140

(56) References Cited

U.S. PATENT DOCUMENTS

| | | | |
|---|---|---|---|
| 3,953,629 A | | 4/1976 | Wesch ........................ 428/36 |
| 4,284,106 A | | 8/1981 | Haas et al. ................. 138/147 |
| 4,478,253 A | * | 10/1984 | Everett .................... 138/149 X |
| 4,657,050 A | | 4/1987 | Patterson .................... 138/149 |
| 4,660,861 A | * | 4/1987 | Argy et al. ............... 138/149 X |
| 4,744,842 A | * | 5/1988 | Webster et al. ......... 138/149 X |
| 4,824,705 A | * | 4/1989 | Persson et al. ......... 138/149 X |
| 5,160,769 A | * | 11/1992 | Garrett .................... 138/149 X |
| 5,795,102 A | * | 8/1998 | Corbishley .............. 138/149 X |
| 6,000,438 A | * | 12/1999 | Ohrn .......................... 138/149 |
| 6,179,610 B1 | * | 1/2001 | Suey et al. ............. 138/149 X |

FOREIGN PATENT DOCUMENTS

| | | |
|---|---|---|
| EP | 1465301 | 2/1977 |
| GB | 1249422 | 10/1971 |
| SE | 405461 | 12/1978 |
| SE | 428149 | 6/1983 |
| SE | 501471 | 2/1995 |
| WO | WO/9219903 | 11/1992 |
| WO | 9500797 | 1/1995 |

* cited by examiner

*Primary Examiner*—Patrick Brinson
(74) *Attorney, Agent, or Firm*—Blank Rome LLP

(57) ABSTRACT

The application discloses an insulated pipework system comprising an outer sleeve, an inner flow pipe and an insulating layer within the space therewith, characterized in that the insulating layer comprises at least one discrete block of a first insulating material substantially surrounded by a second insulating material in particulate form. This enables the discrete blocks of the first insulating material to provide the majority or all of the necessary insulation, whilst the particulate second insulating material can be packed around the first material in order to provide the necessary shear force transfer. It is preferred if the first insulating material has a lower thermal conductivity than the second, more preferably a thermal conductivity of less than half of the second. It is still more preferred if the thermal conductivity of the first material is less than 35% of the second, yet still more preferably less than 25%. It is also preferred if the first insulating material is silica block. A suitable thickness for the first insulating material is between 10 and 5 mm, more preferably between 15 and 25 mm. The average particle diameter if the second insulating material is preferably less than $150^{th}$ of the average block size of the first material. More preferably, the particle diameter is less than $400^{th}$ of the average block size.

14 Claims, 3 Drawing Sheets

Fig. 1 – PRIOR ART
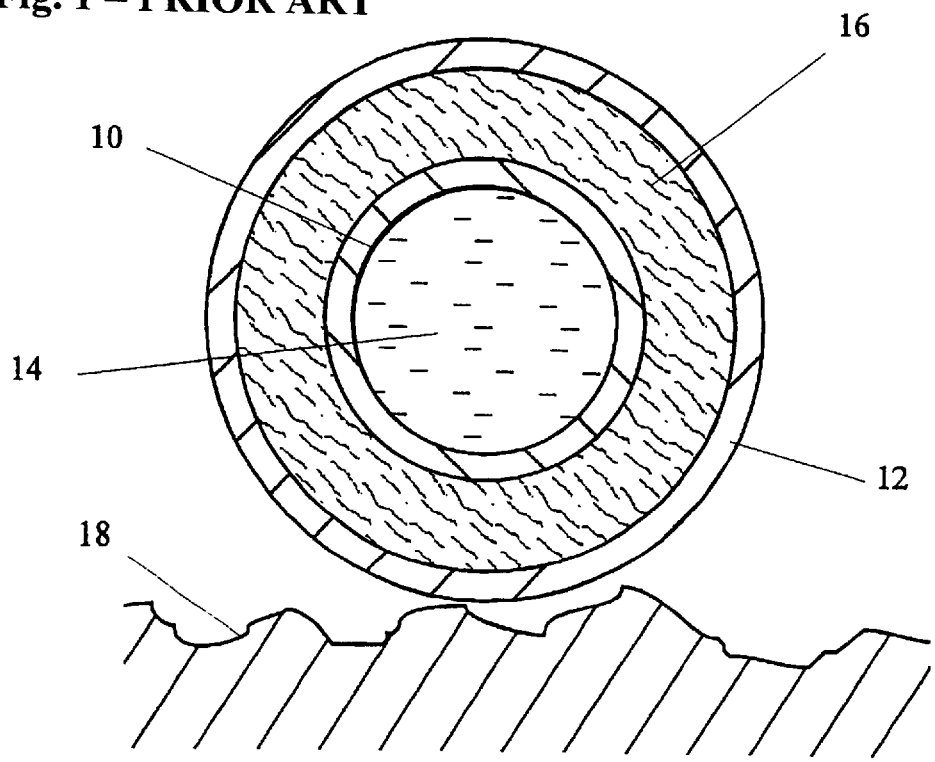
(a)
(b)
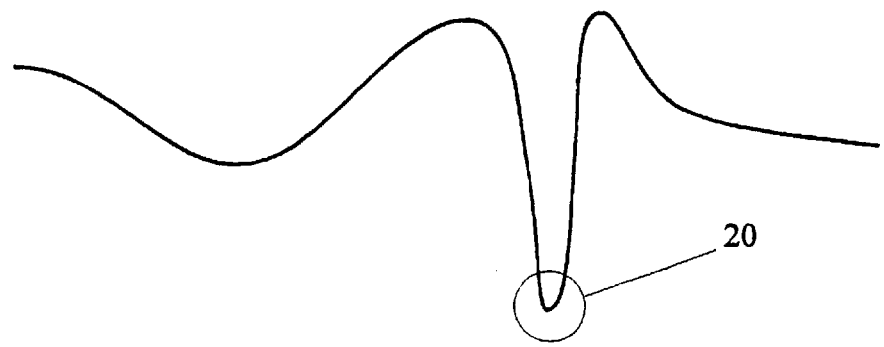
(c)
Fig. 2

Fig. 3a
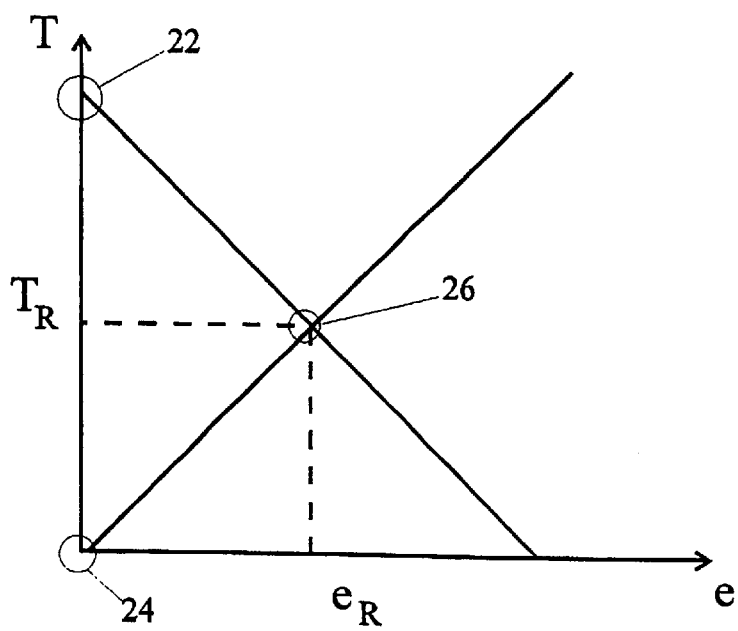
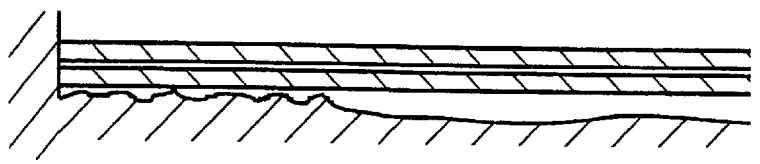
Fig. 3b
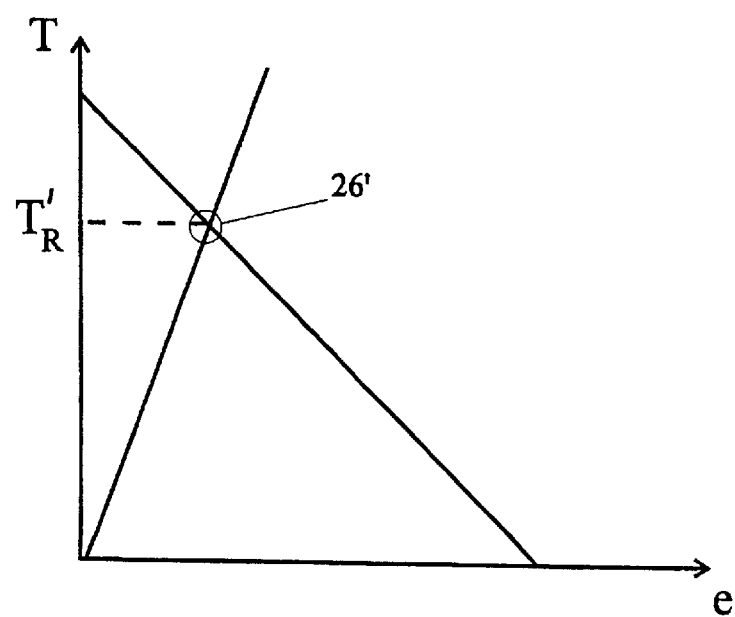

INSULATED PIPEWORK SYSTEMS

TECHNICAL FIELD OF THE INVENTION

The present invention relates to insulated pipework systems.

BACKGROUND ART

Such systems are used for transporting oil and/or gas from off-shore oil wells. They consist of a pipeline formed of a double walled pipe comprising an inner flow line within an outer sleeve. The pipes are generally coaxial, and the annulus between the two pipes contains an insulating material. Oil or gas extracted from underground reservoirs is normally at an elevated temperature and the insulation serves to maintain it in that state. If oil were to be allowed to cool then the higher melting point fractions would crystallise and could potentially block the flow line. It is therefore necessary in the design of such a pipe structure to ensure that the insulating material provides sufficient insulation to maintain an adequate temperature along the entire length of the flow line.

FIG. 1 shows a known double walled pipe structure comprising an inner flow pipe 10 held concentrically within an outer sleeve pipe 12. Crude oil 14 flows within the flow pipe 10. An insulating material 16 is placed in the annular region between the flow pipe 10 and the sleeve pipe 12. The entire assembly is shown resting on the sea bed 18.

An inevitable result of maintaining the crude oil at elevated temperature is that at least the flow pipe 10 will be subjected to thermal expansion. This will result inter alia in either an extension of the longitudinal length of the pipeline, or an increase in the longitudinal stress in the pipeline. Such stresses as may result from an increase to 190° C. are capable of causing plastic deformation in a steel pipeline. There are two generally accepted means of absorbing these thermal expansion problems; the first is to bury the pipeline beneath the seabed hence fixing it in position and preventing deformation. The other is to allow the initially straight pipeline shown in FIG. 2a to adopt a meandering course as shown in FIG. 2b and hence take up the increase in length. It is important that the longitudinal extension is maintained within acceptable limits, else a kink such as shown at 20 in FIG. 2c can develop. Such kinks, or areas of excessively high curvature, can cause the pipeline structure to exceed its design limitations.

Double walled pipe structures are effective in limiting the overall longitudinal extension, as shown in FIG. 3a. In the absence of longitudinal extension, the flow pipe 10 will be at an elevated tension shown at point 22, whilst the sleeve pipe 12 at ambient temperature will be at zero tension, shown at point 24. If both pipes are allowed to extend longitudinally, the composite structure will adopt a position in which the compressive tension in the flow pipe 10 balances the tensile tension in the sleeve pipe 12, i.e. at point 26. This point is a compromise situation in which the tension $T_R$ in both pipes is lower than a confined unextended pipeline, and the resultant extension is less than in an unconstrained single walled pipeline.

In order for this behaviour to be predictable, it is important that the flow and sleeve pipes 10 and 12 remain in longitudinal register, i.e. that individual elements of the pipe do not become longitudinally separated. The reason for this is shown schematically in FIG. 3b, in which it has been assumed that part of the sleeve pipe 12 is constrained, for example by interaction with the seabed, and that the corresponding part of the flow pipe 10 has become free to move longitudinally relative to that part of the sleeve pipe 12. This means that extension of the sleeve pipe 12 takes place effectively along a shorter length identified as 28, whilst extension of the flow pipe takes place along the entire length. The result of this is that a smaller extension of the sleeve pipe 12 will cause the same increase in tension, and the balance point 26' is at a significantly greater tension in both pipelines. This tension is greater than the original design tension arrived at in FIG. 3a and must therefore be avoided.

The maintenance of both pipelines in longitudinal register is commonly referred to as "longitudinal compliance". It will be clear that longitudinal compliance is achieved by ensuring adequate transfer of longitudinal forces between the two pipes.

In existing pipelines, longitudinal compliance has been achieved by solid steel links between the two pipes at regular intervals. The difficulty inherent in this is that the links are an integral part of the flow line 10 which is intended to carry a fluid at an elevated temperature and pressure. This means that the entire structure must therefore meet the required design standards for the inner pipe, which requires careful control of the production conditions. This difficulty inevitably increases the cost.

In the system described in our earlier application now published as WO 96/36831, such castings were omitted and the bulkheads disclosed therein were used to seal in place hollow alumina-silicate microspheres as the insulating medium 16. Such microspheres can, when compacted, provide a significant shear force transfer between the two pipes 10, 12. Hence, such a compacted insulator was capable of ensuring longitudinal compliance. The system disclosed in WO 96/36831 relied on this effect.

SUMMARY OF INVENTION

Other solid insulating materials are generally polymeric and are unable to withstand the elevated temperatures involved without degrading within the lifetime of the pipe. Fibrous insulation materials such as mineral wool have substantially no shear strength whatsoever and cannot therefore contribute to longitudinal compliance. One solid insulating material which is capable of withstanding elevated temperatures is commonly referred to as silica block. This is available in the form of a proprietary product called "Microtherm" (Registered Trade Mark) made by the company Micropore International Limited of Droitwich, England. A similar product is available as Wacker-WDS (Registered Trade Mark) from Wacker-Chemie GmbH of Munich, Germany. However, this insulating material exists as a solid block and cannot be compacted in place within the annulus. Thus, it cannot be used to transfer shear stresses or radial loads reliably.

Thus, the use of microspheres provides a significant advantage in the construction of the pipeline. However, microspheres offer only moderate thermal insulation as compared to other insulating materials. Approximate figures for the coefficient of thermal conductivity of alternative insulation materials are as follows.

| Material | Conductivity $Wm^{-1}K^{-1}$ |
| --- | --- |
| Silica block | 0.02 |
| Polyurethane foam | 0.03–0.06 |

-continued

| Material | Conductivity Wm⁻¹K⁻¹ |
|---|---|
| Mineral Wool | 0.04 |
| Microspheres | 0.1 |
| Syntactics | 0.17 |

Thus, double walled pipe systems based on silica block, polyurethane foam and mineral wool offer the advantage that the external sleeve pipe of the double walled pipe system can be reduced in diameter in view of the lesser thickness of insulation material needed.

Where very high levels of insulation are needed, the required thickness of the microsphere insulation layer can become so great that the double walled pipe design becomes impractical. In these circumstances, therefore, alternative insulation materials are essential if a smaller practical and efficient sleeve pipe size is to be used.

The present invention therefore provides an insulated pipework system comprising an outer sleeve, an inner flow pipe and an insulating layer within the space therebetween, characterised in that the insulating layer comprises at least one discrete block of a first insulating material substantially surrounded by a second insulating material in particulate form.

This enables the discrete blocks of the first insulating material to provide the majority or all of the necessary insulation, whilst the particulate second insulating material can be packed around the first material in order to provide the necessary shear force transfer.

It is preferred if the first insulating material has a lower thermal conductivity than the second, more preferably a thermal conductivity of less than half that of the second. It is still more preferred if the thermal conductivity of the first material is less than 35% of the second, yet still more preferably less than 25%.

It is naturally preferred if the second insulation material is alumina-silicate microspheres.

It is also preferred if the first insulating material is silica block.

Preferably, the average diameter of the second insulating material is between 30 and 300 $\mu$m.

A suitable thickness for the first insulating material is between 10 and 50 mm, more preferably between 15 and 25 mm.

The average particle diameter of the second insulating material is preferably less than $150^{th}$ of the average block size of the first material. More preferably, the particle diameter is less than $400^{th}$ of the average block size.

BRIEF DESCRIPTION OF DRAWINGS

The embodiments of the present invention will now be described by way of example, with reference to the accompanying Figures, in which:

FIG. 1 is a cross-section of a conventional double walled pipeline;

FIGS. 2a, 2b and 2c show absorption of thermal expansion by deviation of the pipe;

FIGS. 3a and 3b illustrate force balancing in double walled pipe structures;

FIGS. 1 to 3 have been described already, and no further description will be given here.

DETAILED DESCRIPTION OF EMBODIMENTS

Figure 4:
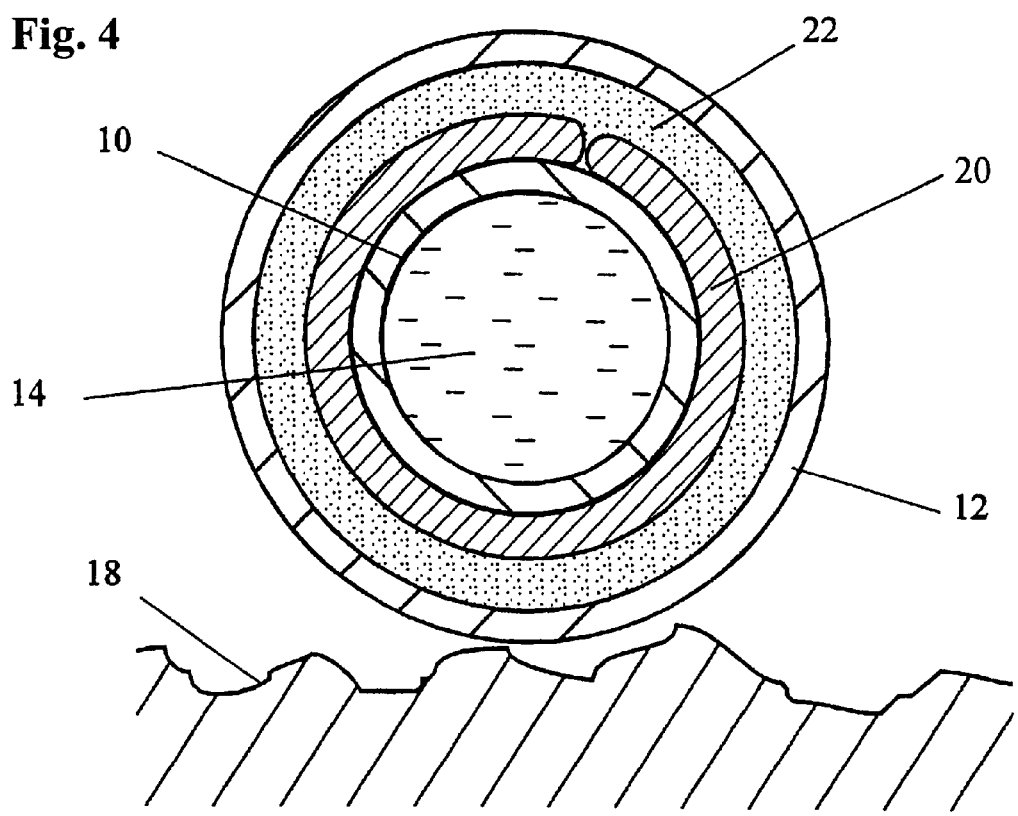
FIG. 4 is a cross-section of a double walled pipe line according to the present invention.

FIG. 4 shows a cross section through a pipeline according to the present invention. An inner flow pipe 10 is surrounded by an outer sleeve 12. Oil or gas 14 flows within the inner flow pipe 10. The entire structure rests on a sea bed 18.

The insulating layer lies in the annulus between the concentric inner flow pipe 10 and outer sleeve 12. It comprises a first layer 20 of Microtherm(RTM) silica block which is wrapped around the inner flow pipe 10. The block is 24 mm thick and is made up of three superimposed layers, each 8 mm thick. A greater or lesser number of layers could be used, depending on the insulation required. For example, 2 layers or 4 layers could be used. A second insulating material 22 comprises alumina-silicate microspheres between 30 and 300 $\mu$m in diameter and is packed into the region within the annulus not occupied by the first insulating material 20. This occupies a thickness of approximately 10 to 80 mm. This second insulating material is then compressed so that it can provide shear force transfer between the inner flow pipe 10 and the outer sleeve pipe 12.

It will be appreciated that many variations can be made to the above embodiment without departing from the scope of the present invention for example, it is not essential that the first insulating material 20 is in the form of a single sheet wrapped around the flow pipe 10. It could, for example be in the form of several blocks distributed within the annulus with the second insulating material 22 packed therebetween. Other variations will be apparent to the skilled reader.

What is claimed is:

1. An insulated pipework system comprising an outer sleeve, an inner flow pipe and an insulating layer within the space therebetween, characterized in that the insulating layer comprises at least one discrete block of a first solid insulating material substantially surrounded by a second insulating material in particulate form.

2. An insulated pipework system according to claim 1 wherein the discrete blocks of the first insulating material provide the majority or all of the necessary insulation.

3. An insulated pipework system according to claim 1 wherein the first insulating material has a lower thermal conductivity than the second.

4. An insulated pipework system according to claim 3 wherein the first insulating material has a thermal conductivity of less than half that of the second.

5. An insulated pipework system according to claim 3 wherein the first insulating material has a thermal conductivity of less than 35% of that of the second.

6. An insulated pipework system according to claim 3 wherein the first insulating material has a thermal conductivity of less than 25% of that of the second.

7. An insulated pipework system according to claim 1 wherein the second insulation material is alumina-silicate microspheres.

8. An insulated pipework system according to claim 1 wherein the first insulating material is silica block.

9. An insulated pipework system according to claim 1 wherein the average diameter of the second insulating material is between 30 and 300 $\mu$m.

10. An insulated pipework system according to claim 1 wherein the first insulating material is between 10 and 50 mm in thickness.

11. An insulated pipework system according to claim 1 wherein the first insulating material is between 15 and 25 mm in thickness.

12. An insulated pipework system according to claim 1 in which the average particle diameter of the second insulating material is less than $150^{th}$ of the average block size of the first material.

13. An insulated pipework system according to claim 1 in which the average particle diameter of the second insulating material is less than $400^{th}$ of the average block size of the first material.

14. An insulated pipework system according to claim 2 wherein the first insulating material has a lower thermal conductivity than the second.

* * * * *